United States Patent
Williams et al.

(10) Patent No.: US 10,776,120 B2
(45) Date of Patent: Sep. 15, 2020

(54) APPARATUS AND METHOD TO GENERATE TRACE DATA IN RESPONSE TO TRANSACTIONAL EXECUTION

(71) Applicant: ARM LIMITED, Cambridge (GB)

(72) Inventors: Michael John Williams, Cambridge (GB); John Michael Horley, Cambridge (GB); Stephan Diestelhorst, Cambridge (GB); Richard Roy Grisenthwaite, Cambridge (GB)

(73) Assignee: ARM Limited, Cambridge (GB)

(*) Notice: Subject to any disclaimer, the term of this patent is extended or adjusted under 35 U.S.C. 154(b) by 76 days.

(21) Appl. No.: 15/555,239

(22) PCT Filed: Feb. 11, 2016

(86) PCT No.: PCT/GB2016/050331
§ 371 (c)(1),
(2) Date: Sep. 1, 2017

(87) PCT Pub. No.: WO2016/139446
PCT Pub. Date: Sep. 9, 2016

(65) Prior Publication Data
US 2018/0260227 A1 Sep. 13, 2018

(30) Foreign Application Priority Data

Mar. 4, 2015 (GB) .................................. 1503632

(51) Int. Cl.
*G06F 9/46* (2006.01)
*G06F 9/52* (2006.01)
(Continued)

(52) U.S. Cl.
CPC .......... *G06F 9/3836* (2013.01); *G06F 9/3857* (2013.01); *G06F 9/466* (2013.01);
(Continued)

(58) Field of Classification Search
CPC ........ G06F 9/3842; G06F 9/467; G06F 9/528; G06F 8/4432; G06F 11/3636; G06F 11/3466; G06F 1/32
See application file for complete search history.

(56) References Cited

U.S. PATENT DOCUMENTS

| 10,331,452 B2* | 6/2019 | Schmitt ............... G06F 11/3636 |
| 2008/0141005 A1* | 6/2008 | Dewitt, Jr. .......... G06F 11/3409 712/220 |

(Continued)

FOREIGN PATENT DOCUMENTS

| CN | 101814018 | 8/2010 |
| CN | 103294534 | 9/2013 |
| JP | 2013-541094 | 11/2013 |

OTHER PUBLICATIONS

Matthias Jurenz, Ronny Brendel, Andreas Knupfer, Matthias Muller, and Wolfgang Nagel, "Memory Allocation Tracing in VampirTrace", Spinger-Verlag Berlin Heidelberg, pp. 839-846 (Year: 2007).*

(Continued)

*Primary Examiner* — Aimee Li
*Assistant Examiner* — Courtney P Carmichael-Moody
(74) *Attorney, Agent, or Firm* — Nixon & Vanderhye P.C.

(57) ABSTRACT

There is provided an apparatus comprising processing circuitry to execute a transaction comprising a number of program instructions that execute to generate updates to state data, to commit the updates if the transaction completes without a conflict, and to generate trace control signals during execution of the number of program instructions. The processing circuitry uses at least one resource during execution of the program instructions. Transaction trace circuitry generates trace items in response to the trace control signals. In response to the trace control signals indicating that a change in a usage level of the at least one resource has occurred during execution of the program instructions, the (Continued)

transaction trace circuitry generates at least one trace item that indicates the usage level of the at least one resource.

23 Claims, 9 Drawing Sheets

(51) Int. Cl.
  *G06F 9/38* (2018.01)
  *G06F 11/36* (2006.01)
  *G06F 11/34* (2006.01)
  *G06F 11/30* (2006.01)
(52) U.S. Cl.
  CPC .......... *G06F 9/467* (2013.01); *G06F 11/3024* (2013.01); *G06F 11/3442* (2013.01); *G06F 11/3466* (2013.01); *G06F 11/3495* (2013.01); *G06F 11/3636* (2013.01); *G06F 2201/87* (2013.01)

(56) References Cited

U.S. PATENT DOCUMENTS

| | | | |
|---|---|---|---|
| 2009/0138890 A1 | 5/2009 | Blake et al. | |
| 2010/0131953 A1 | 5/2010 | Dice et al. | |
| 2010/0191706 A1 | 7/2010 | Newport et al. | |
| 2011/0145516 A1* | 6/2011 | Adl-Tabatabai | G06F 8/458 711/152 |
| 2012/0079246 A1* | 3/2012 | Breternitz, Jr. | G06F 9/30072 712/208 |
| 2012/0227045 A1* | 9/2012 | Knauth | G06F 9/3863 718/100 |
| 2013/0047169 A1 | 2/2013 | Gagliardi et al. | |
| 2013/0339561 A1 | 12/2013 | Greiner et al. | |
| 2013/0339688 A1 | 12/2013 | Busaba et al. | |
| 2013/0339959 A1 | 12/2013 | Busaba et al. | |
| 2014/0040557 A1 | 2/2014 | Frey et al. | |
| 2014/0101411 A1* | 4/2014 | Sakarda | G06F 1/329 712/42 |
| 2014/0250436 A1 | 9/2014 | Tang et al. | |
| 2015/0006717 A1 | 1/2015 | Schmitt et al. | |
| 2015/0026688 A1* | 1/2015 | Dice | G06F 9/467 718/102 |
| 2015/0032884 A1 | 1/2015 | Greifeneder et al. | |
| 2015/0186178 A1* | 7/2015 | Kassa | G06F 9/467 718/101 |
| 2015/0355996 A1* | 12/2015 | Smith | G06F 11/3636 717/128 |
| 2015/0378779 A1* | 12/2015 | Busaba | G06F 9/30098 711/147 |
| 2016/0357596 A1* | 12/2016 | Busaba | A63B 69/18 |
| 2017/0286260 A1* | 10/2017 | Baartmans | G06F 9/466 |

OTHER PUBLICATIONS

International Search Report for PCT/GB2016/050331, dated Apr. 22, 2016, 4 pages.
Written Opinion of the Isa for PCT/GB2016/050331, dated Apr. 22, 2016, 7 pages.
Search Report for GB1503632.0, dated Sep. 4, 2015, 3 pages.
European Office Action dated Jun. 29, 2018 in EP Application No. 16704911.3, 4 pages.
Office Action for IL Application No. 254160 dated Jun. 16, 2019, 8 pages.
Office Action for Japanese Application No. 2017-545261 dated Nov. 1, 2019, 5 pages.
First Office Action for CN Application No. 201680012576.7 dated Jun. 1, 2020 and English translation, 20 pages.

* cited by examiner

| | |
|---|---|
| | OUTPUT TSTART PACKET |
| IA [accesses address 64] | OUTPUT TRESOURCE PACKET (USAGE=1) |
| IB [accesses address 240] | OUTPUT TRESOURCE PACKET (USAGE=2) |
| IC [accesses address 68] | NO TRACE |
| ID [accesses address 352] | OUTPUT TRESOURCE PACKET (USAGE=3) |
| | OUTPUT TEND PACKET |

APPARATUS AND METHOD TO GENERATE TRACE DATA IN RESPONSE TO TRANSACTIONAL EXECUTION

This application is the U.S. national phase of International Application No. PCT/GB2016/050331 filed 11 Feb. 2016, which designated the U.S. and claims priority to GB Patent Application No. 1503632.0 filed 4 Mar. 2015, the entire contents of each of which are hereby incorporated by reference.

TECHNICAL FIELD

The present technique relates to data processing systems. In particular, the present technique has relevance to the field of data processing systems that support transactions.

BACKGROUND

There may be provided data processing systems that support transactions in which a number of program instructions are executed speculatively in order to generate updates to state data that are then committed if the transaction completes without a conflict. Since the updates are only committed if the transaction completes without a conflict, such updates are also referred to herein as speculative updates until such time as they are committed. At any time until the transaction ends, the transaction can be aborted, that is complete without finishing, due to a conflict, thereby causing the data processing system to rewind or revert to a state prior to when the transaction began. This "rewinding" can hence occur in the event of a conflict between the instructions executed as part of the transaction and instructions that are executed elsewhere. During the transaction, the speculatively updated state is stored in transactional memory. If no conflict occurs, and the transaction is not aborted, then at the end of the transaction, the transaction is "committed" at which time the speculative state (i.e. the transactional state) replaces the actual state of the data processing system.

Such transactions may be used, for example, to facilitate multi-threaded processing using a shared memory in which transactions using data values within the shared memory may be allowed to proceed in parallel relying upon the ability to avoid committing speculative updates should a conflict arise between memory accesses. In most cases, such conflicts do not arise and accordingly the parallel processing proceeds efficiently without the need to support the overhead of more rigid mechanisms, such as the use of memory locks, and yet when a conflict does arise it is possible to recover as the speculative updates to state data will not have been committed.

SUMMARY

Viewed from a first example arrangement, there is provided an apparatus comprising: processing circuitry to execute a transaction comprising a number of program instructions that execute to generate updates to state data, to commit the updates if the transaction completes without a conflict, and to generate trace control signals during execution of the number of program instructions, the processing circuitry using at least one resource during execution of the program instructions; and transaction trace circuitry to generate trace items in response to the trace control signals, in response to the trace control signals indicating that a change in a usage level of the at least one resource has occurred during execution of the program instructions, the transaction trace circuitry generating at least one trace item that indicates the usage level of the at least one resource.

According to a second example arrangement there is provided a method of generating trace items comprising the steps of: executing a transaction comprising a number of program instructions to generate updates to state data; committing the updates if the transaction completes without a conflict; generating trace control signals during execution of the number of program instructions, wherein the execution of the program instructions uses at least one resource; and generating the trace items in response to the trace control signals, wherein in response to the trace control signals indicating that a change in a usage level of the at least one resource has occurred during execution of the program instructions, generating at least one trace item that indicates the usage level of the at least one resource.

In accordance with a third example arrangement there is provided an apparatus comprising: means for executing a transaction comprising a number of program instructions to generate updates to state data; means for committing the updates if the transaction completes without a conflict; generating means for generating trace control signals during execution of the number of program instructions, wherein the execution of the program instructions uses at least one resource; and means for generating the trace items in response to the trace control signals, wherein in response to the trace control signals indicating that a change in a usage level of the at least one resource has occurred during execution of the program instructions, the generating means for generating generates at least one trace item that indicates the usage level of the at least one resource.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
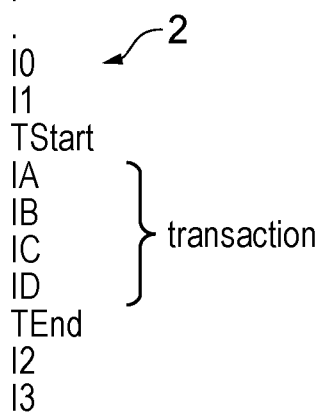
FIG. 1 schematically illustrates a stream of program instructions including a transaction.

Before discussing the embodiments with reference to the accompanying figures, the following description of embodiments and associated advantages is provided.

Within processing systems which support transactions, such as systems incorporating transactional memory, a number of program instructions execute to generate speculative updates to state data (e.g. architectural state data) and operate to permit (commit) those speculative updates if the transaction concerned completes without a conflict. As an example, a transaction may include load or store operations to memory locations and if those load and store operations complete without an access from outside the transaction attempting to make a conflicting (or potentially conflicting) access to the same memory locations, then the results of those transactions are committed and update the architectural system state. If there is a conflict, then the transaction aborts and saved previous state data is used to "roll back" the state of the system to a point before the transaction was executed. The transaction may then be repeated sometime later to see if it completes without a conflict arising, may give rise to an exception, may be executed in a different way (e.g. using a lock mechanism) or otherwise processed depending upon the particular form of the system concerned.

Other types of conflicts that can cause a transaction to abort include exhaustion of resources for managing a transaction (e.g. temporary storage, depth counter for nested transactions, etc.) or an exception, such as a data abort (MMU fault), interrupt, etc. interrupting the transaction.

In accordance with one example arrangement there is provided an apparatus comprising: processing circuitry to execute a transaction comprising a number (i.e. one or more) of program instructions that execute to generate speculative updates to state data, to commit the speculative updates if the transaction completes without a conflict, and to generate trace control signals during execution of the number of program instructions, the processing circuitry using at least one resource during execution of the program instructions; and transaction trace circuitry to generate trace items in response to the trace control signals, in response to the trace control signals indicating that a change in a usage level of the at least one resource has occurred during execution of the program instructions, the transaction trace circuitry generating at least one trace item that indicates the usage level of the at least one resource.

The inventors of the present invention have realised that there is a particular advantage to be gained in obtaining data relating to significant events of a transaction. For example, a significant event might include the change in usage level of a resource (such as the transactional memory) that is used during execution of the transaction. For example, a change in usage level may occur as a result of a cache line or area of memory being newly accessed or written to. By obtaining such information, it is possible to better control the usage of that resource and also more efficiently execute the transaction in the future. The present technique may therefore involve obtaining information that indicates whether or not an instruction that is executed as part of a transaction adds to the transactional state (which increases the amount of transactional memory used), overwrites part of the transactional state (which has no effect on the transactional memory used), or neither (which also has no effect on the transactional memory used). Such information can then be used to generate trace items that indicate that the usage level of the resource has changed.

The trace data items generated for a transaction can then be analysed in order to profile that transaction. For example, determining the proportion of resources a given transaction uses during execution can be particularly useful in a heterogeneous system comprising a plurality of processors in order to make better decisions about which processor is used to execute a transaction in order to more efficiently use system resources.

In some embodiments, the processing circuitry detects the change in the usage level of the at least one resource; and the processing circuitry identifies the change in the usage level of the at least one resource in the trace control signals. Accordingly, the trace control signals generated by the processing circuitry may indicate the change in the usage level of the at least one resource. These trace control signals may then be passed to the transaction trace circuitry, which generates the trace items based on the change in usage level of the at least one resource as identified by the trace control signals.

In some embodiments, the trace circuitry determines, from the trace control signals, the change in the usage level of the at least one resource. In such embodiments, the transaction trace circuitry itself may keep track of the usage level of the at least one resource based on the trace control signals that are generated by the processing circuitry. For example, the processing circuitry may generate trace control signals that indicate a particular resource is being used and the transaction trace circuitry may determine from those trace control signals whether the resource is being newly used (causing a change in the overall usage level of the at least one resource).

In some embodiments, the at least one resource is a storage structure comprising a plurality of portions; and the change in the usage level is detected each time a new portion is accessed. For example, the change in the usage level may occur in response to a new portion of the storage structure being written to. In some embodiments, the transactional memory may be implemented using a cache and so the storage structure may be at least a part of a cache and the portions may be cache lines. Cache lines may store one or more elements of the state that have been speculatively changed as a result of executing instructions forming the transaction.

In, for example, a directly mapped cache, the storage structure may be the entirety of a cache. In a set associative cache, there are a plurality of locations in the cache in which a particular piece of data can be stored. The cache is split into multiple ways and the plurality of locations comprises one location in each way. For example, in a two-way associative cache, there are two locations in which any piece of data can be stored. The plurality of locations may be referred to as a cache set. For example, in a two-way associative cache, each piece of data can be stored in a cache set comprising two ways. A further example of a significant event may be that all of the ways of a cache set are filled up. Alternatively, a significant event may be that all of the ways of a cache set are filled up and an attempt is made to write to the same cache set. Either of these scenarios may represent the situation in which further execution of the transaction cannot proceed as a consequence of running out of space in which to store the speculative state, which can lead to the transaction being aborted. By profiling such transactions, it is possible to determine that in the future, the transaction should execute on a processor having a higher associativity cache. Conversely, it may be determined that a high associativity cache is unnecessary and a cache having a lower associativity may be usable.

In some embodiments, the plurality of trace items comprises at least one resource trace item which indicates that one of the plurality of portions has been newly accessed. For example, when a portion (such as a cache line) is newly accessed, a trace item may be generated that indicates that the portion has been newly accessed.

In some embodiments, the plurality of trace items comprises at least one resource trace item which identifies a number of the plurality of portions that have been accessed. For example, the resource trace item may provide a running count of the number of portions that have been accessed since the transaction began. Such information can be used to quickly determine how the resource usage changes over time, as well as to determine the instantaneous resource usage at a particular moment. For example, the resource trace item may be generated in response to the end of a transaction (e.g. as a consequence of the transaction aborting or being committed). The at least one resource trace item can be used in order to profile the resource usage during the execution of the transaction.

By indicating, in a resource trace item, the number of the plurality of portions that have been accessed, it is possible to reduce the size of the trace stream and thereby reduce the resource requirements for a memory in which the trace stream is stored by effectively rolling several resource trace items into one. Additionally, in some cases, the trace items may be stored within a circular buffer. When this happens, the head of the buffer may become overwritten after a period of time. By indicating the number of the plurality of portions that have been accessed, it may still be possible to perform effective profiling, even if the head of the buffer becomes overwritten. However, by indicating whenever a portion is newly accessed, it is possible to reduce the amount of hardware necessary to generate the trace items since it is not necessary to keep a running track of resource usage.

The plurality of trace items may comprise at least one trace item, which identifies a transaction depth of a transaction. A transaction may be nested within another transaction. A transaction depth may be defined as the number of parent transactions that were entered into prior to the current transaction being started and may or may not include the transaction itself. Transaction depth can be tracked using a counter. However, as with all counters, there is a maximum value that can be stored in that counter. If a particular transaction is nested deeply enough, such that the counter's maximum value would be exceeded, then that transaction (and potentially all the container transactions) might have to be aborted. A change in the depth counter value is therefore a significant event and, accordingly, it can be useful to output trace items that contain an indication of the transaction depth of a transaction. The depth counter itself may also be an example of the at least one resource whose change in usage level causes a trace item to be generated. This can provide a warning that the current level of transaction nesting is approaching the point at which the transactions will have to be aborted.

In some embodiments, the plurality of trace items comprises at least one of: a transaction start trace item, indicating that a transaction has started, and a transaction end trace item, indicating that a transaction has ended. It is thereby possible to trace significant events as they relate to a specific transaction.

In some embodiments, the transaction trace item is also a resource trace item. In particular, the same trace item that indicates that a transaction has ended may also indicate that a change in usage level of a resource has occurred. Similarly, other trace items may perform dual functionality. The label accorded to a trace item is not, therefore, exhaustive of its functionality.

In some embodiments, at least some of the plurality of trace items each comprises a timestamp. For example, at least one of the transaction start trace item and the transaction end trace item may comprise a timestamp indicating a time at which instructions to start and end a transaction, respectively, were executed. By providing timestamps, it is possible to determine when a particular significant event occurred. In particular, in a multi processor system, it may be possible to determine how significant events relating to transactions that are executed across each of the processors occurred. This can be useful in helping to determine the nature and cause of conflicts that occur during the execution of transactions.

In some embodiments, at least one of the plurality of trace items comprise a cycle count indicating the number of processor cycles used to execute the transaction. For example, the end trace item may comprise a cycle count indicating the number of processor cycles used to execute the transaction. Such information can be used in order to determine the extent to which a processor was used when executing a particular transaction.

The plurality of trace items may comprise a transaction abort trace item indicating that a transaction has been aborted. A transaction will abort in response to a conflict occurring. For example, if one processor executes a transaction that modifies data and another processor executes a second transaction that attempts to modify the same data, then a conflict would occur as a result of the same data being simultaneously modified by two different processors. This would generally result in the transactions being aborted. Where a transaction abort trace item is generated, the transaction abort trace item may indicate a reason for the transaction having been aborted. For example, a transaction abort trace item may refer to a conflict having occurred, as previously described. Another reason for a transaction aborting may be that the transactional memory, which may be used to hold speculative state during the execution of a transaction, runs out.

The apparatus may comprise control storage to store control parameters to affect operation of the transaction trace circuitry. For example, the control storage may store an enable parameter to enable or disable operation of the transactions trace circuitry.

The control storage may store a sampling parameter to control how many transactions the transaction trace circuitry operates on. Rather than sampling every transaction, it is often desirable to only sample some of the transactions (and, where appropriate, any transactions nested within those transactions). The sampling parameter could be, for example, either a proportion, indicating a proportion of transactions (and, where applicable, their nested transactions) that are sampled by the transaction trace circuitry or a probability that the transaction (and, where applicable, its nested transactions) is sampled by the transaction trace circuitry.

In some embodiments, the processing circuitry is further to execute instructions other than those in any transaction. In other words, the processing circuitry may execute instructions that are not part of any transaction.

The apparatus may comprise program trace circuitry to operate on at least some instructions. For example, the program trace circuitry may provide trace items that provide debugging information on the result of executing each instruction. In contrast, the transaction trace circuitry may generate trace items that relate to significant events related to the transaction such as a change in the usage level of at least one resource that is used during execution of the transaction. Accordingly, for instructions within a transaction, two sets of trace items could be generated—one by the program trace circuitry, and one by the transaction trace circuitry.

The processing circuitry may comprise a first processor and a second processor. In such embodiments, the apparatus may comprise an analysis module to update control information to influence which of the first processor and the second processor is used for execution of a future transaction. For example, the first processor and the second processor may have different capabilities. In such instances, it might be possible to use the trace items generated by the transaction trace circuitry in order to perform a profiling of a particular transaction and thereby determine which of the first processor and the second processor is more appropriate for future execution of that transaction. For example, one of the first processor and the second processor may have a smaller number of resources available. Based on the trace items generated, it may be possible to determine that the processor with the smaller number of resources will be suitable for executing a particular transaction. In these instances, it might be desirable to execute that transaction on the processor with the smaller number of resources in order to reduce energy usage. Similarly, the trace items that are generated may indicate that the processor with the smaller number of resources may be unsuitable for future execution of that transaction, particularly if the resources ran out during a previous execution of the transaction. That transaction may therefore be executed by the processor with a larger number of resources in the future in order to reduce the chances of the transaction being aborted and thereby rewound in the future. Such an analysis module may, for example, be provided as software that executes on the processing circuitry.

Particular embodiments will now be described with reference to the figures.

FIG. 1 schematically illustrates a stream of program instructions 2 which may be executed by processing circuitry. It will be appreciated that this stream of program instructions may be one executing thread within a multi-threaded system. Alternatively, the stream of program instructions may be the only thread of program instructions executing. Within the stream of program instructions illustrated in FIG. 1, there are included a transaction start instruction TStart and a transaction end instruction TEnd. These instructions respectively indicate the boundaries of a transaction comprising instructions IA, IB, IC and ID. These instruction delimited by the TStart and the TEnd are executed by the processing circuitry to generate speculative updates to state data. These speculative updates are stored within memory, or other storage resources, of the system (e.g. shadow registers, special purpose memory permitting roll back, and the like) until it is determined that the transaction has completed without a conflict at which point the speculative updates are committed to the system (e.g. update the architectural state of the system with the stored roll back data then being discarded freeing up the associated memory resource to support a further transaction). The storage resources used to store the speculative updates may be referred to as transactional memory.

Figure 2A:
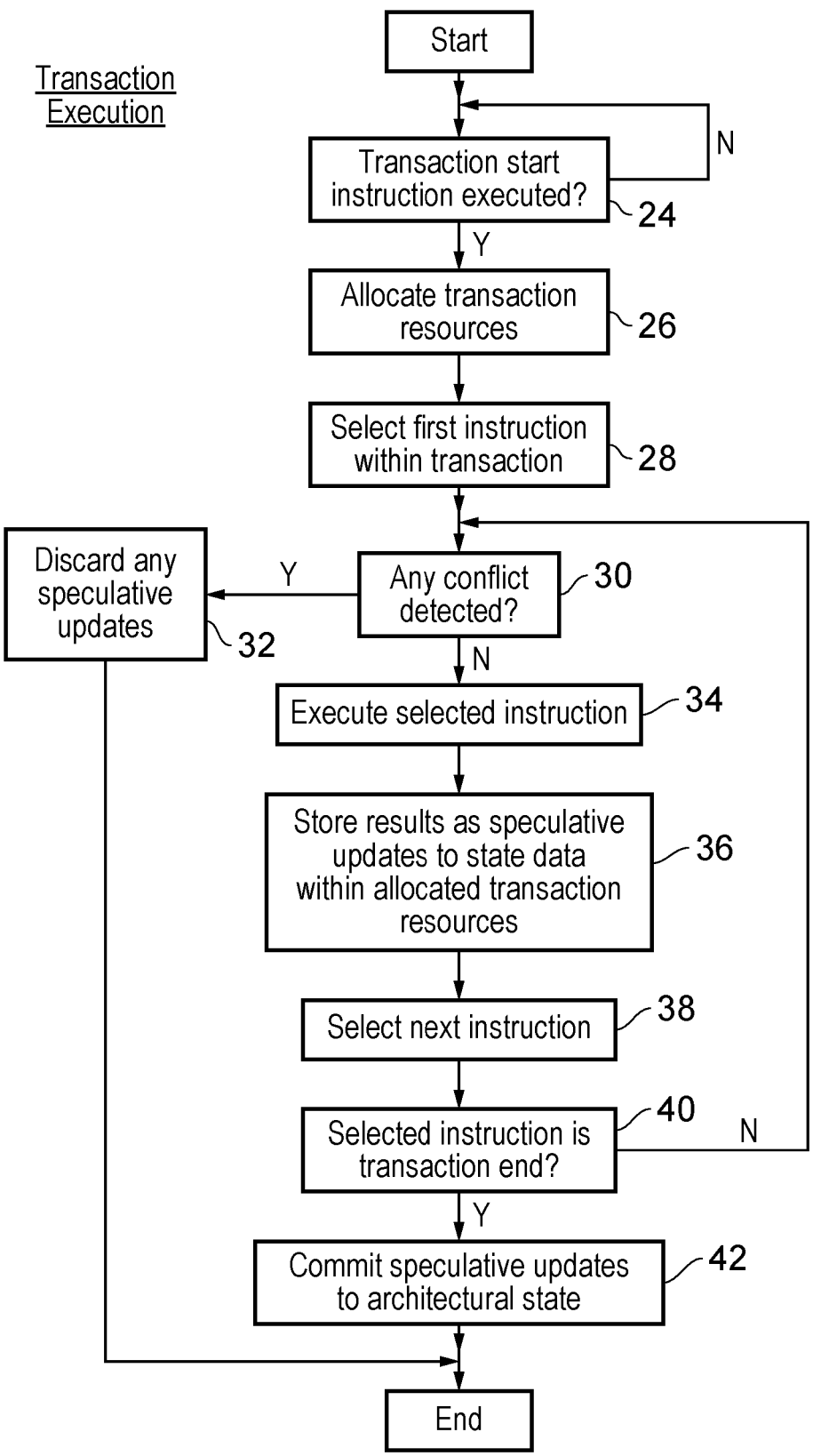
FIG. 2A is a flow diagram schematically illustrating the execution of a transaction.

FIG. 2A is a flow diagram schematically illustrating the execution of a transaction comprising multiple program instructions. At step 24 processing waits until a transaction start instruction (TStart) is executed. Step 26 then allocates transaction resources to be used, for example, resources to store the speculative updates to state data prior to the transaction completing. Step 28 selects the first instruction within the transaction. Step 30 determines whether or there are any conflicts detected at that time. If there are any such conflicts detected, then step 32 serves to discard any speculative updates, jump to a fix-up routine (or otherwise indicate to the software that the transaction has failed) and return the transaction resources allocated at step 26 for use in other transactions.

If there are no conflicts detected at step 30, then step 34 serves to execute the selected instruction. Step 36 then stores the results of the execution at step 34 as speculative updates to state data within the allocated transaction resources. Step 38 selects a next instruction. Step 40 determines whether or not the selected instruction is a transaction end instruction (TEnd). If the instruction is not a transaction end instruction, then processing returns to step 30. If the determination at step 40 is that the selected instruction is a transaction end instruction, then step 42 serves to commit the speculative updates stored within the allocated transaction resources so as to update the architectural state of the system.

Figure 2B:
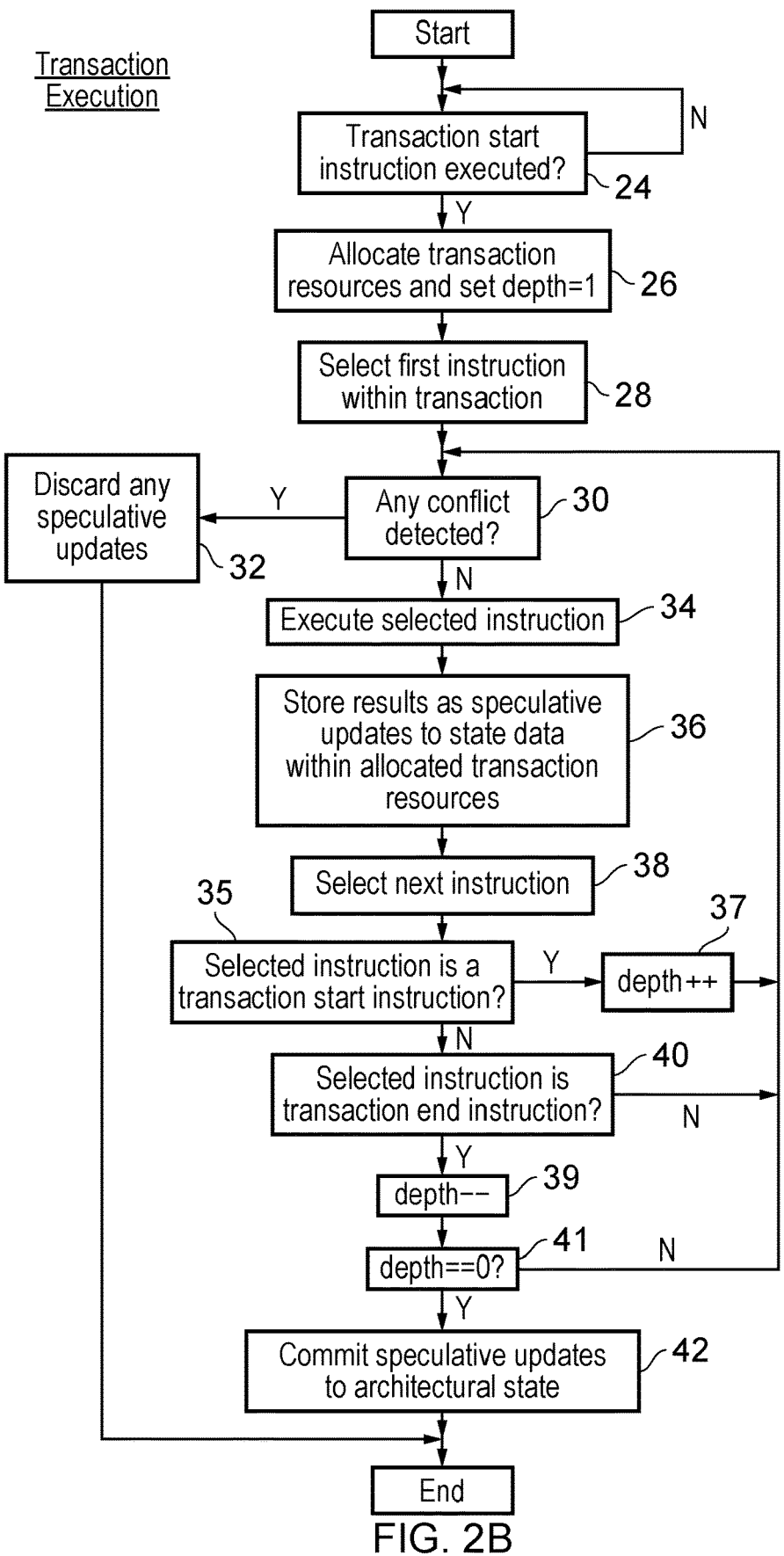
FIG. 2B is a flow diagram schematically illustrating the execution of nested transactions.

FIG. 2B is a flow diagram schematically illustrating the transaction execution of FIG. 2A modified to support flat transaction nesting. At step 26 a transaction nest depth counter is set to "1" when the transaction resources are allocated. After the next instruction is selected at step 38, step 35 determines if the selected instruction is a transaction start instruction. If the selected instruction is a transaction start instruction, then step 37 serves to increment the depth counter and processing returns to step 30.

If the determination at step 35 is that the selected instruction is not a transaction start instruction, then step 40 determines if the selected instruction is a transaction end instruction. If the selected instruction is not a transaction end instruction, then processing returns to step 30. If the selected instruction is a transaction end instruction, then step 39 decrements the depth counter and step 41 determines if the depth counter has a value equal to zero. If the depth counter does not equal zero, then processing again returns to step 30. If the depth counter does equal zero, then processing proceeds to step 42 as in FIG. 3A.

The action of FIG. 2B is to track the flat nested transaction depth and to commit the speculative updates stored in the allocated transaction resources, in response to the transaction started at step 24, when that same transaction is ended. An abort serves to abort all nested transactions. It is also possible that other example embodiments may support true nesting of transactions.

Figure 3:
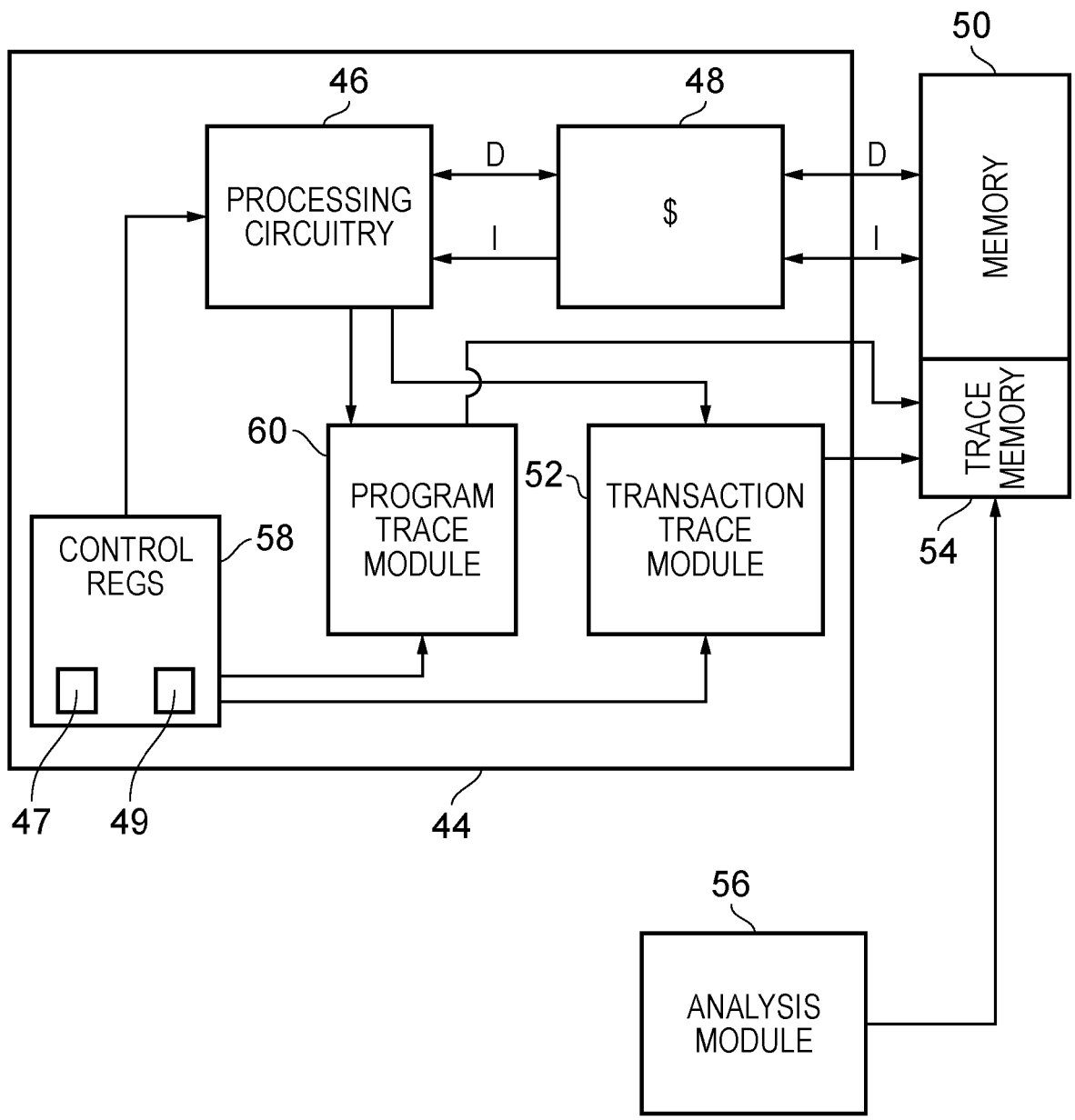
FIG. 3 is a diagram schematically illustrating an apparatus in accordance with one embodiment.

FIG. 3 schematically illustrates an apparatus 44 in accordance with one embodiment. The apparatus 44 comprises processing circuitry 46 for executing a stream of instructions 2 comprising a transaction as well as instructions that do not form part of any transaction.

The processing circuitry 46 in this embodiment uses a cache 48 as a transactional memory for storing speculative state as a consequence of executing the instructions in a transaction. In addition, the cache 48 can be used for obtaining program instructions and also for acting as part of a memory hierarchy in combination with a general purpose memory 50. The speculative state is stored in cache 48 until such time that the transaction is committed or aborted. If the transaction is committed, the transactional state stored in the cache 48 will be permitted to be stored to the memory 50 where it can be accessed by other processing circuits. If aborted, the transactional state is discarded.

The cache 48 is an example of a resource that is used during execution of the transaction. In particular, as different data values are changed during the execution of a transaction, those changed values may be stored within cache lines of the cache 48. Changing the same value repeatedly only causes that value in the cache to be altered. Consequently, the resource usage would not change. However, as additional data values are altered, the usage level (i.e. the amount of the resource that is used) of the cache 48 increases. The apparatus 44 also comprises a transaction trace module 52, which receives trace control signals from the processing circuitry that indicate changes in the usage level of at least one resource that is used by the processing circuitry 46 during execution of the instructions. When such a resource is newly used, a TResouce trace item is output. In this embodiment, the at least one resource is the cache 48 and the control signals directly notify the transaction trace module 52 when the usage level changes. However, in other embodiments, the trace control signals may indicate that a particular part of the cache 48 has been used and the transaction trace module 52 must keep track of whether or not that part of the cache 48 is being newly used and produce TResource trace items as necessary.

The transaction trace module 52 generates trace items, which are stored in a trace memory 54. These can be analysed by analysis module 56 in order to perform profiling of the transaction. The analysis module 56 may, for example, store profiling results in a memory 50 which can in turn be used to affect the behaviour of the processing circuitry 46. For example, the analysis module 56 may determine that the resource usage (e.g. the extent to which the processing circuitry 46 uses the cache 48 when executing a particular transaction) is sufficiently small that in the future when that transaction is to be executed, it may be executed on a processor comprising a small cache or on a cache with a different shape/configuration (such as having a lower associativity) that might otherwise affect its ability to execute the transaction. This makes it possible for other processing circuitries to be deactivated, which can lead to energy savings. Similarly, if the execution of a particular transaction was aborted as a consequence of insufficient resources being available (for example if the cache 48 was not sufficiently big) then the profiling performed by the analysis module 56 can cause the future execution of that transaction by the processing circuitry 46 to occur on a processor that has access to a larger cache (or one with a different shape/configuration, such as one with a higher associativity). This would inhibit the transaction from repeatedly aborting during future execution. The analysis module may be implemented either in hardware as analysis circuitry or by software that may execute, for example, on the processing circuitry 46. In the embodiment shown in FIG. 3, the apparatus 44 comprises a program trace module 60 in addition to the transaction trace module 52. The program trace module 60 might also generate trace items that are stored in the trace memory 54 in response to the execution of instructions. Those instructions may or may not form part of a transaction. However, the program trace module 60 differs from the trace module 52 in that the trace items generated by the transaction trace module 52 relate to significant events of the transaction itself such as a change in resource usage, whereas the trace items generated by the program trace module 60 relate directly to the execution of a particular instruction. Optional control registers 58 can also be provided to control the transaction tracing operation. In particular, an enable parameter 47 is used to turn the tracing performed by the transaction trace module on or off. A sampling parameter 49 can also be used to indicate how many transactions ought to be sampled. For example, the sampling parameter can represent the proportion of transactions to be sampled or can represent the probability that a given transaction is to be sampled. Other parameters can be provided in addition or in place of those mentioned here.

Figure 4:
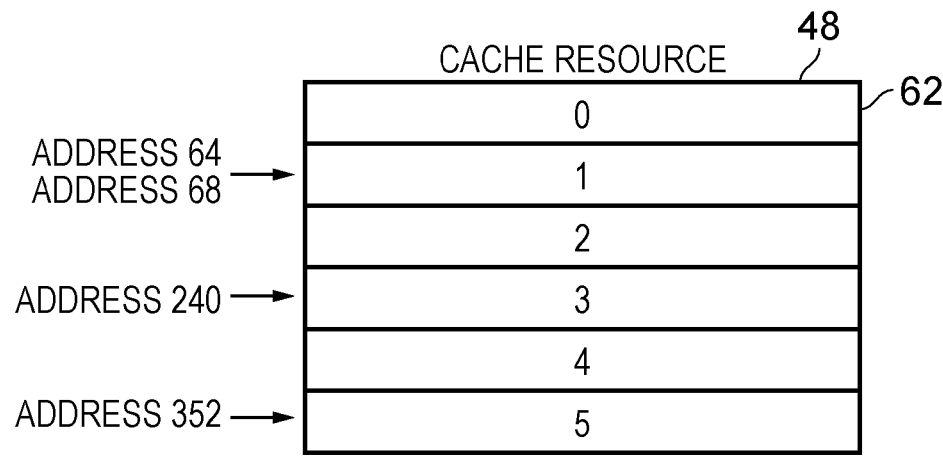
FIG. 4 is a diagram illustrating the effect on the usage of a resource as a consequence of executing instructions within a transaction.

FIG. 4 illustrates how the execution of instructions may affect a resource (in particular the transactional memory, which is implemented by the cache 48) during a transaction. The transaction is made up from instructions IA, IB, IC, and ID. At the start of a transaction a TStart packet will be output as a trace item of the transaction trace module 52. In this embodiment, it is assumed that each of the instructions IA, IB, IC, and ID cause a value to be updated. Since these instructions form part of a transaction, the instructions are executed speculatively and only committed at the end of the transaction. Until that time, the speculative state (i.e. the values that have been updated speculatively) may be stored in the transactional memory, i.e. the cache 48. The cache 48 is made up from a plurality of cache lines 62.

A new value is stored to a cacheline whenever a data value is updated within a transaction. If the cacheline to which the new value is written has not been written to before, then the usage level of the cache 48 increases. If an instruction accesses the same data value multiple times (e.g. if the same data value is written to repeatedly) or if a data value, which is stored on a cacheline that has already been written to, is updated, then the usage level of the cache 48 will not change.

In this example, it is assumed that the cachelines have a length of 64 bytes. Instruction IA causes a data value held at an address 64 to be updated. This is in cacheline 1 (64/64=1). Since, in this transaction, cacheline 1 has not been previously written to, this represents an increase in the usage of the resource/cache 48 and so a TResource packet will be output as a trace item. In this example, the TResource packet indicates the overall usage of the resource/cache 48 and therefore as a result of executing instruction IA, the usage level of the cache 48 is 1. Instruction IB causes an address 240 to be accessed. This is in cacheline 3 (240/64=3 remainder 48). Since cacheline 3 has not been written to in this particular transaction, another TResource packet will be output indicating that the usage level of the resource/cache 48 has increased to 2. The instruction IC causes address 68 to be accessed. This is in cacheline 1 again (68/64=1 remainder 4). Since a cacheline is not being newly written to (cacheline 1 was already accessed by instruction IA), there is no increase of the usage of the cache/resource 48. Accordingly, no trace item is output by the transaction trace module 52. Instruction ID causes an address 352 to be accessed. Again, this represents a change in the usage level of the resource/cache 48, since the address is in cacheline 5 (352/64=5 remainder 32), which has not been previously written to in this transaction. Accordingly, a TResource packet is output, indicating that the resource usage level is now 3 (i.e. 3 resource lines 1, 3 and 5 have been written to since the transaction began). The change in resource usage in this case is one example of a significant event occurring and can be used for the purposes of profiling the transaction. Note that in this embodiment, the TResource packet (trace item) indicates the overall usage level of the resource/cache 48. This is advantageous if the trace items are stored into a circular buffer, since it may allow profiling to take place even if the complete history of trace items is not available. This eventually happens in a circular buffer as newer entries replace older entries. In other embodiments, the TResource packet may be generated after each new access and it may be necessary to determine, during a profiling operation, the usage level of the resource after each such packet. This can be advantageous since it removes the need for the TResource packet to include a multibit absolute value to represent resource usage. Instead, the TResource packet need only carry a delta value, which might be a single or no bits.

In some embodiments, a single TResource packet may be output at the end of the transaction, in order to indicate the overall resource usage during that transaction.

In some embodiments, the cache 48 is set associative. For example, consider the same set of instructions when used with a cache having 4 cache sets, each of two ways.

Instruction IA writes to address 64, which is in set 1 (64/64=1). Instruction IB writes to address 240, which is in set 3 (240/64=3 remainder 48). Instruction IC writes to address 68. This is again in cache set 1 (68/64=1 remainder 4) and so this instruction does not increase the resource usage. Instruction ID writes to address 352. This is in set 1 (352/64=5 remainder 32 and 5 mod 4=1). This would be a different cacheline (the cacheline to the other way of the set) to that written to by instructions IA and IC because it is a different base address. This instruction would therefore cause the second way of set 1 to be accessed, and therefore a new cacheline has been used.

The trace items themselves may also have a variety of formats. For example, some (such at the TStart and TEnd packets) may include timestamps. In other embodiments, all of the packets may include timestamps. This can make it easier to compare the behaviour of multiple processors in a multi-processor system. In some embodiments, the TEnd trace item may include a cycle count that indicates how many cycles of the processing circuitry 46 were used during execution of the transaction.

Figure 5:
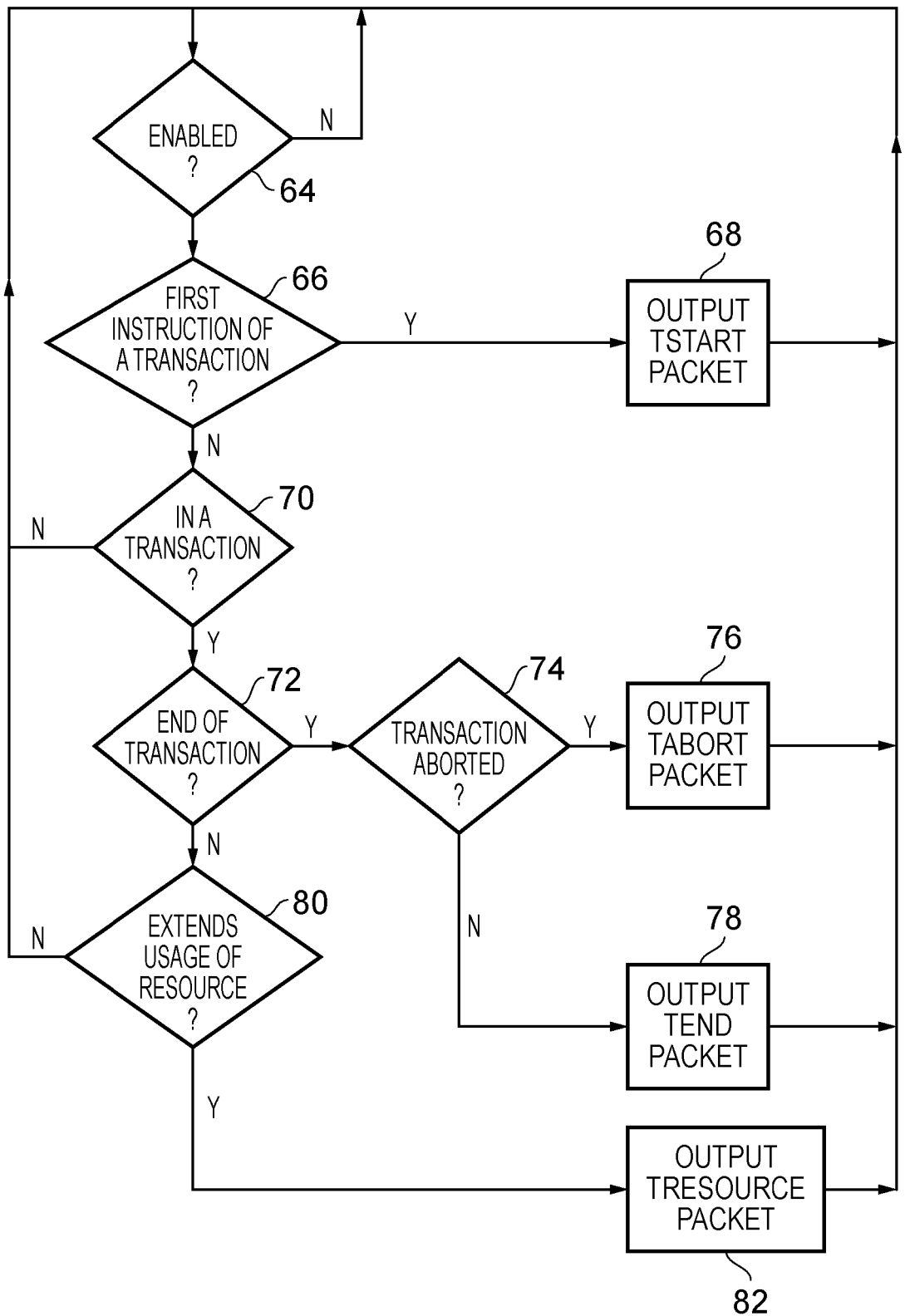
FIG. 5 is a flow diagram schematically illustrating the generation of trace items during execution of a transaction in accordance with one embodiment.

FIG. 5 is a flow chart illustrating the operation of the transaction trace module 52 in accordance with one embodiment. At step 64, when a new instruction is to be executed, it is determined whether or not the enable parameter 47 in the control registers 58 is set or not. The enable parameter 47 controls whether or not the transaction trace module 52 is to produce trace items or not. If this parameter is not set, then the flow returns to step 64. In other words, flow does not proceed past this point until such time as the enable parameter 47 is set. When the enable parameter 47 is set then at step 66 it is determined whether or not the instruction being executed by the processing circuitry 46 is the first instruction of a transaction. If so, then at step 68, a TStart packet is output as a trace item and flow returns to step 64. If not, then at step 70 it is determined whether or not a transaction is currently being executed. If not, then flow returns to step 64 and otherwise flow proceeds to step 72. At step 72, it is determined whether or not the transaction is ending. This may occur, for example, as the result of an abort (e.g. if the transaction fails) or as a result of the transaction ending normally, which may result in a commit occurring. If at step 72 it is determined that the transaction is ending, then at step 74 it is determined whether or not the transaction is being aborted. If the transaction is being aborted then at step 76 a TAbort packet is output as a trace item otherwise a TEnd packet is output as a trace item at step 78. In either event, flow returns to step 64. Note that in some embodiments, the TAbort packet may include a reason indicative as to why the abort occurred. If it is determined at step 72 that the transaction is not ending then it is determined at step 80 whether or not the usage level of a resource used by the processing circuitry 46 is extended as a consequence of the current instruction being executed. If this is not the case then the flow returns to step 64 and alternatively at step 82 a TResource packet is output as a trace item and flow returns to step 64.

Note that each iteration of the flow chart in FIG. 5 represents the execution of a new instruction. In particular, step 64 occurs in response to a new instruction.

Figure 6:
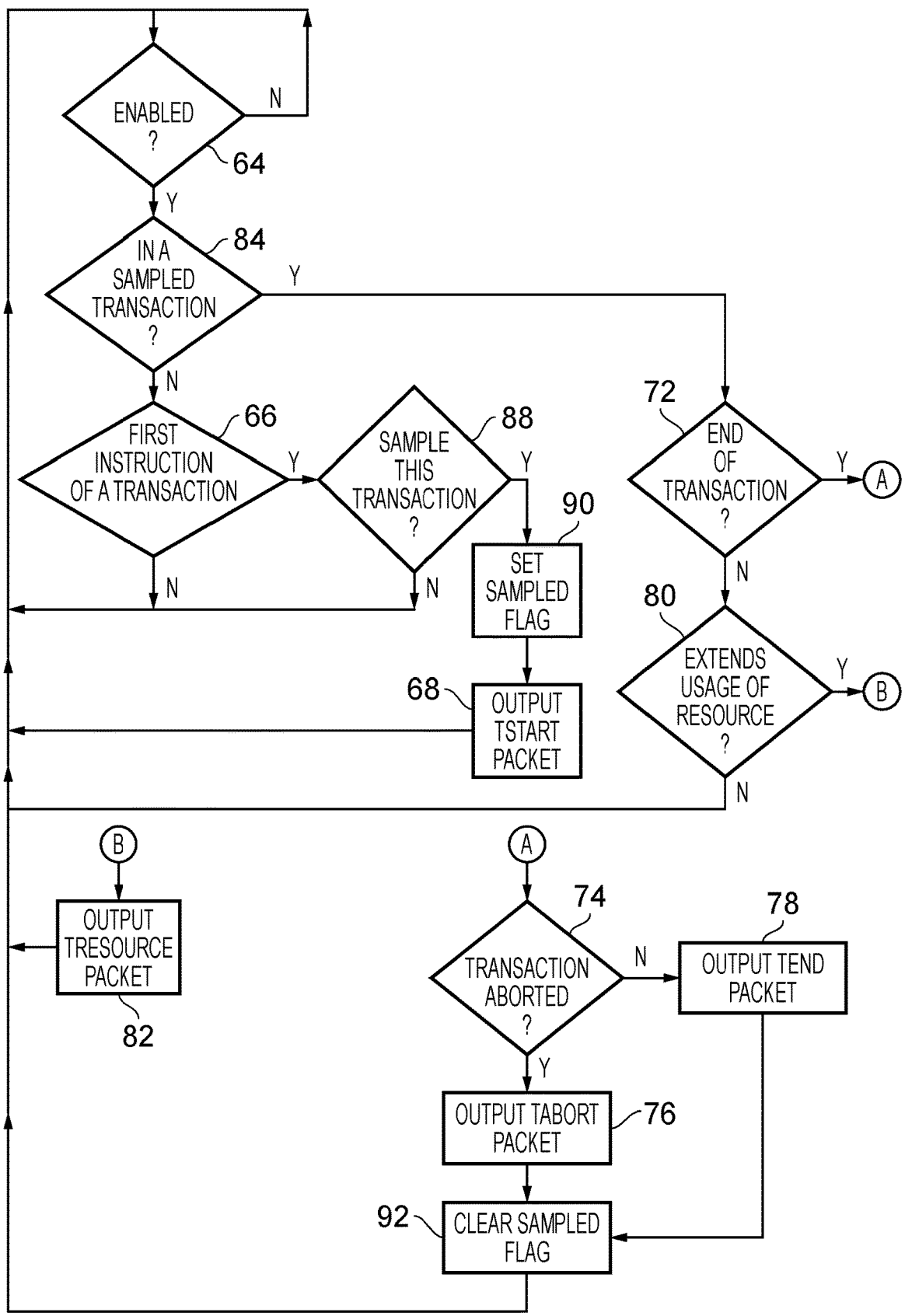
FIG. 6 is a flow diagram schematically illustrating the generation of trace data items for a subset of transactions in accordance with one embodiment.

FIG. 6 is a flow chart illustrating an example of how the transaction trace module 52 operates in accordance with one embodiment where it is assumed that there is a sampling parameter 49 that causes a proportion of the transactions to be traced. Such a parameter can define a probability that a particular transaction is to be traced, or a proportion indicating the proportion of the transactions that are to be traced.

Again at step 64, in response to a new instruction, it is determined whether or not the enable parameter 47 is set and if the enable parameter 47 is set then flow proceeds to step 84 in which it is determined whether or not a sampled transaction is currently being executed. In other words, it is determined whether or not a sampled flag is set. If not, then at step 66 it is determined whether or not the instruction is the first instruction of a transaction. If the instruction is not the first instruction of a transaction, then flow returns to step 64 and if it is, then at step 88 it is determined whether or not the current transaction should be sampled. As previously discussed with reference to FIG. 3, this can be determined based on a proportion or a probability. Where the sampling parameter 49 represents a proportion of transactions to be sampled, this can be achieved by the use of a counter that is incremented every time a new transaction is encountered and each time the counter reaches the value of the sampling parameter, the new transaction is sampled and the counter is reset. In the case of a probability being represented, a random number may be generated and if the random number is less than the probability, then the new transaction is sampled. In any event, if at step 88 it is determined that the current transaction is not to be sampled, then flow returns to step 64. Alternatively, flow proceeds to step 90 in which the sampled flag is set thereby influencing the outcome next time step 84 executes. Flow then proceeds to step 68 in which a TStart packet is output, indicating that a new transaction has begun. Flow then returns to step 64. Alternatively, if at step 84 it is determined that the instruction being executed is part of a sampled transaction (e.g. the sampled flag is set) then at step 72 it is determined whether or not the transaction is ending. As discussed, this may be as the result of a transaction being committed or as a result of the transaction being aborted.

If the transaction is not ending then at step 80, it is determined whether or not the current instruction extends the usage of the resource. If not, then flow returns to step 64 and if so then at step 82 a TResource packet is output as previously discussed. If at step 72, the transaction is ending, then step 74 determines whether or not the transaction was aborted. If not, then the transaction is ending normally (as the result of a commit) and so a TEnd packet is output at step 78. At step 92, the sampled flag is cleared indicating that the current transaction is no longer being sampled, and flow returns to step 64. Alternatively, if at step 74 it is determined that the current transaction is being aborted then a TAbort packet is output at step 76. Flow then proceeds to step 92 as previously described.

Figure 7:
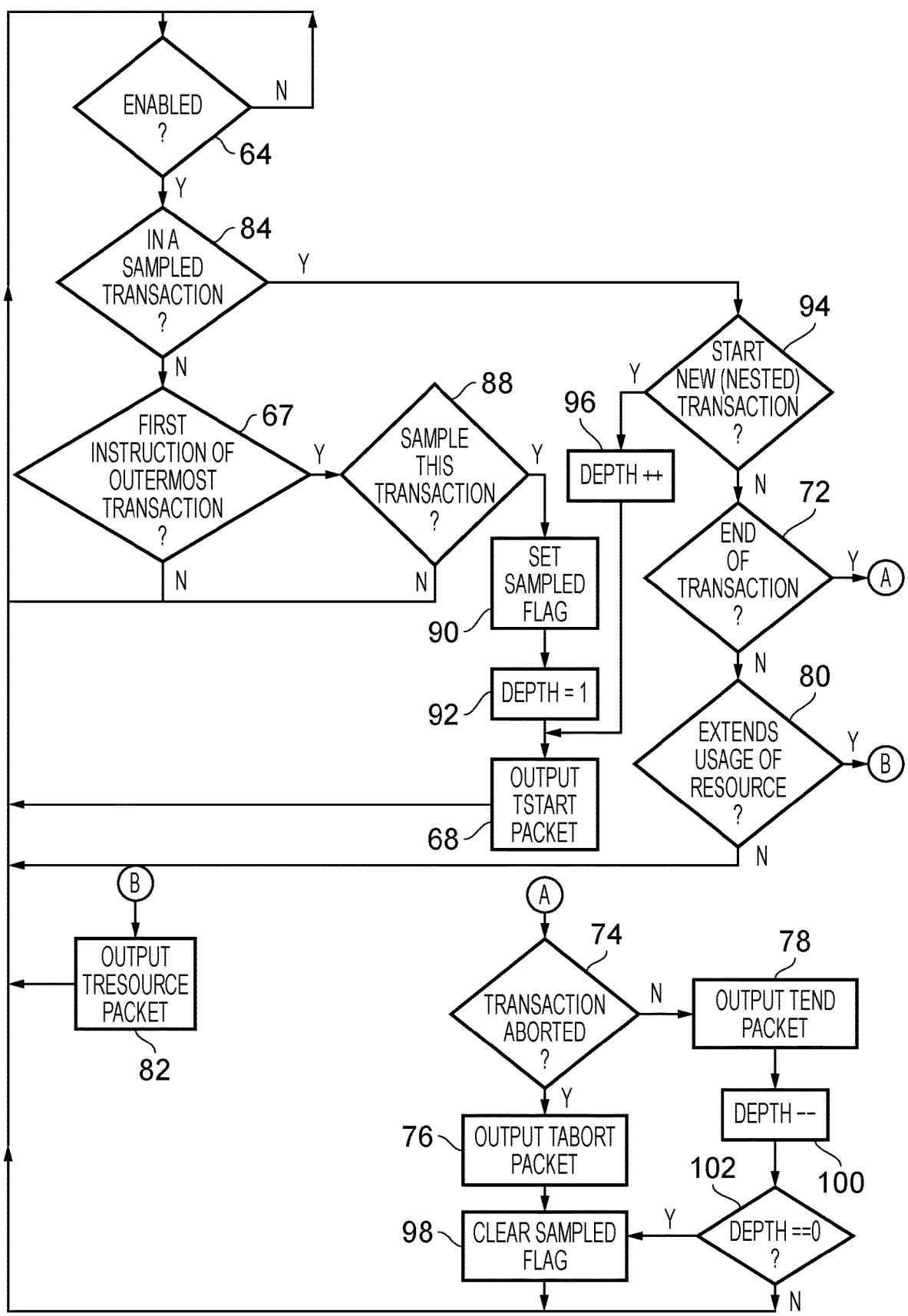
FIG. 7 is a flow diagram schematically illustrating the generation of trace items during execution of nested transactions in accordance with one embodiment.

FIG. 7 is a flow chart illustrating the operation of the transaction trace module 52 in accordance with an embodiment in which only a proportion of transactions are sampled (traced) and in which there may be nested transactions. The flow chart is similar to that of FIG. 6 and similar reference numerals have been used where the process is the same. The main differences in the embodiment illustrated in FIG. 7 are the provision of the depth counter, which increments each time a transaction starts and decrements each time a transaction ends. Additionally, if a transaction is to be sampled or traced, then all transactions within that transaction are also sampled or traced. Note that in this embodiment, if a transaction is aborted then all transactions are aborted. Furthermore, for a nested transaction, the transaction does not end until the outermost (lowest depth) transaction ends. Accordingly, in this embodiment, all transactions in a nest are traced, or none of them are. In other embodiments, a transaction may be traced even if the outer transactions are not traced. Such embodiments may use modified TStart and TEnd packets to indicate that a transaction being traced is nested. This may be accomplished by including a flag, by issuing TStartNested and TEndNested instructions, or by including a value of a depth counter in the TStart and TEnd packets to indicate the depth of a transaction being started or ended. One advantage of including a flag or only using different packet types (TStartNested and TEndNested) is that the packets are smaller as a result of having to represent less information. Conversely, an alternative of including a value of a depth counter is that, in the event that a circular buffer is employed, it may be possible to determine more information in the event that the head of the list of trace items starts to get overwritten by the tail.

In other embodiments, if tracing of an (inner) nested transaction begins, this tracing may continue until the outermost transaction has ended.

Note that the depth counter itself may also be an example of a resource whose usage level is tracked. For example, whenever a nested transaction begins, the depth counter may increase and a TResource packet may be output (at step 82). Similarly, a decrease in the depth counter may also cause a TResource packet (at step 82) to be output in order to indicate the change.

In the embodiment shown in FIG. 7, step 67 asks whether the current instruction is the first instruction of an outermost transaction. If so, flow proceeds to step 88 and if not, flow returns to step 64 as previous discussed. Hence, tracing may only begin at the start of an outermost transaction.

After the sample flag is set at step 90, the depth counter is set to 1 at step 92. Flow then proceeds to step 68 where the TStart packet is output. Additionally, if it is determined that the currently executing instruction is in a sampled transaction at step 84, then at step 94 it is determined whether a new (nested) transaction is being started. If so, then at step 96, the depth counter is incremented, and flow proceeds to step 68 where a TStart packet is output. Alternatively, if a new nested transaction is not being started at step 94, then flow proceeds to step 72 where it is determined whether or not the transaction is ending as previously discussed. Furthermore, if it is determined that a transaction is to be aborted at step 74, then after outputting the TAbort packet at step 76, step 98 causes the sampled flag to be cleared before flow returns to step 64. Alternatively, if at step 74, a transaction is not aborted then a TEnd packet at step 78, the depth counter is decremented at step 100, and flow proceeds to step 102. If at step 102 it is determined that the depth counter is not equal to 0 (meaning that the outermost transaction has not yet been reached) then flow returns to step 64, otherwise the flow proceeds to step 98 in which the sampled flag will be cleared.

Figure 8:
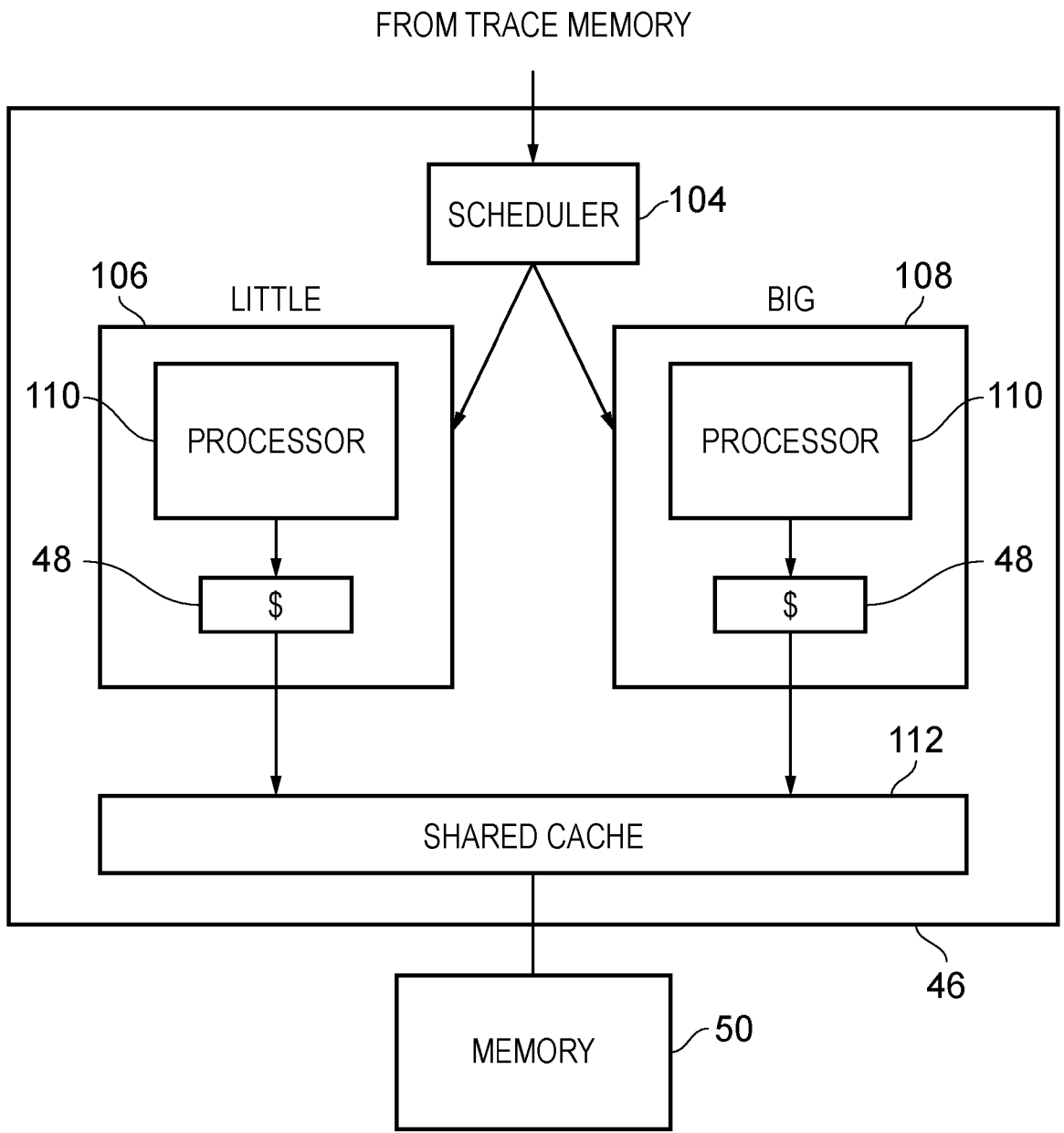
FIG. 8 is a diagram schematically illustrating how trace items can be used in order to influence future execution of transactions.

FIG. 8 illustrates an embodiment in which a "little" processing device 106 and a "big" processing device 108 are provided. The processing circuitry 46 also comprises a scheduler 104, which may be implemented as software and may, for example, run on one of the little processing device 106 and big processing device 108. The scheduler is able to use the profiling output from the analysis module 56, which may be stored in the memory 50, in order to determine how the future execution of a transaction is to be handled. Each of the processing devices 106, 108 comprises its own processor 110 and cache 48. Additionally, the processing devices 106, 108 have access to a shared cache 112. In this embodiment, the little processing device 106 uses a smaller amount of energy by virtue of, for example, having a smaller cache 48 in comparison to the big processing device 108. Consequently, the profiling performed by the analysis module 56 can be used in order to determine which of the devices is best suited for the future execution of a transaction. In particular, the profiling can determine that only a small number of resources, such as a cache, are required for the execution of a transaction. Consequently the scheduler 104 determines that the next time that transaction is to be executed, it is to be executed on the little processing device 106. This can save energy as compared to using the much larger big processing device 108, particularly if the big processing device 108 becomes idle and can be powered off. In contrast, if a particular transaction has a high resource usage requirement, then the scheduler 104 can cause the future execution of that transaction to take place on the big processing device 108 thereby seeking to pre-empt the possibility of the transaction aborting as a consequence of there being insufficient resources for the transaction to successfully complete on the little processing device 106. In a similar way, it may be determined that a high associativity cache is required or that a low associativity cache may be used. For example, the resource usage level may be the number of ways remaining in a cache set. If this number drops below a predefined value (such as 0) then the next time the transaction executes, it may be desirable to execute it on a cache having a higher associativity so that the number of ways in a cache set do not run out. Conversely, if the number remains above a predefined value, then next time it may be desirable to execute it on a cache having a lower associativity.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims.

For example, various combinations of the features of the dependent claims could be made with the features of the independent claims without departing from the scope of the present invention.

The invention claimed is:

1. An apparatus comprising:
processing circuitry to execute a transaction comprising a number of program instructions that execute to generate updates to state data, to commit the updates if the transaction completes without a conflict, and to generate trace control signals during execution of the number of program instructions, the processing circuitry using at least one resource during execution of the program instructions; and transaction trace circuitry to generate trace items in response to the trace control signals, wherein:

the at least one resource comprises a cache comprising a plurality of portions, and in response to detecting that the transaction has accessed a new portion of the cache not previously having been accessed within the transaction, the transaction trace circuitry is configured to generate a resource usage extension trace item indicating that the new portion of the cache not previously having been accessed is accessed within the transaction, and the transaction trace circuitry is configured to omit generation of the resource usage extension trace item in response to the transaction accessing a portion of the cache previously having been accessed within the transaction, the transaction trace circuitry is adapted to transmit the trace items including the resource usage extension trace item to a trace memory, and the trace memory is accessible by an analysis module.

2. An apparatus according to claim 1, wherein the processing circuitry detects a change in a usage level of the at least one resource; and the processing circuitry identifies the change in the usage level of the at least one resource in the trace control signals.

3. An apparatus according to claim 1, wherein the transaction trace circuitry determines, from the trace control signals, a change in a usage level of the at least one resource.

4. An apparatus according to claim 1, wherein the plurality of portions are cache lines.

5. An apparatus according to claim 1, wherein the trace items comprises at least one trace item, which identifies a transaction depth of a transaction.

6. An apparatus according to claim 1, wherein the trace items comprises at least one of: a transaction start trace item, indicating that a transaction has started, and a transaction end trace item, indicating that a transaction has ended.

7. An apparatus according to claim 6, wherein at least one of the trace items comprise a cycle count indicating a number of processor cycles used to execute the transaction; and the transaction end trace item comprises a cycle count indicating the number of processor cycles used to execute the transaction.

8. An apparatus according to claim 1, wherein at least some of the trace items comprise a timestamp.

9. An apparatus according to claim 1, wherein at least some of the trace items comprise a timestamp, and at least one of a transaction start trace item and a transaction end trace item comprise a timestamp.

10. An apparatus according to claim 1, wherein at least one of the trace items comprise a cycle count indicating a number of processor cycles used to execute the transaction.

11. An apparatus according to claim 1, wherein the trace items comprises a transaction abort trace item, indicating that the transaction was aborted.

12. An apparatus according to claim 11, wherein the transaction abort trace item indicates a reason for the transaction was aborted.

13. An apparatus according to claim 1, wherein the apparatus comprises control storage to store control parameters to affect operation of the transaction trace circuitry.

14. An apparatus according to claim 13, wherein the control storage is to store an enable parameter to enable or disable operation of the transaction trace circuitry.

15. An apparatus according to claim 13, wherein the control storage is to store a sampling parameter to control how many transactions the transaction trace circuitry operates on.

16. An apparatus according to claim 15, wherein the sampling parameter is either a proportion indicating a proportion of transactions that are sampled by the transaction trace circuitry, or a probability indicating the probability that the transaction is sampled by the transaction trace circuitry.

17. An apparatus according to claim 1, wherein the processing circuitry is further to execute instructions other than those in any transaction.

18. An apparatus according to claim 1, wherein the apparatus comprises program trace circuitry to operate on at least some instructions.

19. An apparatus according to claim 1, wherein the processing circuitry comprises a first processor and a second processor.

20. An apparatus according to claim 19, wherein the apparatus comprises the analysis module; and the analysis module is adapted to update control information to influence which of the first processor and the second processor is used for execution of a future transaction.

21. An apparatus according to claim 20, wherein the analysis module is software to execute on the processing circuitry.

22. A method of generating trace items comprising the steps of:

executing a transaction comprising a number of program instructions to generate updates to state data;

committing the updates if the transaction completes without a conflict;

generating trace control signals during execution of the number of program instructions, wherein the execution of the program instructions uses at least one resource;

generating trace items in response to the trace control signals;

wherein the at least one resource comprises a cache comprising a plurality of portions, in response to detecting that the transaction has accessed a new portion of the cache not previously having been accessed within the transaction, generating a resource usage extension trace item indicating that the new portion of the cache not previously having been accessed is accessed within the transaction, and omitting generation of the resource usage extension trace item in response to the transaction accessing a portion of the cache previously having been accessed within the transaction; and transmitting the trace items including the resource usage extension trace item to a trace memory, which is accessible by an analysis module.

23. An apparatus comprising:

means for executing a transaction comprising a number of program instructions to generate updates to state data;

means for committing the updates if the transaction completes without a conflict;

means for generating trace control signals during execution of the number of program instructions, wherein the execution of the program instructions uses at least one resource;

means for generating trace items in response to the trace control signals, wherein the at least one resource comprises a cache comprising a plurality of portions, and in response to detecting that the transaction has accessed a new portion of the cache not previously having been accessed within the transaction, the means for generating trace items is configured to generate a resource usage extension trace item indicating that the new portion of the cache not previously having been accessed is accessed within the transaction, and the means for generating trace items is configured to omit generation of the resource usage extension trace item in response to the transaction accessing a portion of the cache previously having been accessed within the transaction; and means for transmitting the trace items including the resource usage extension trace item to a means for storing trace items, which is accessible by an analysis module.

* * * * *